(12) United States Patent
Marcus

(10) Patent No.: US 11,184,686 B2
(45) Date of Patent: *Nov. 23, 2021

(54) METHOD AND APPARATUS FOR EFFICIENT, ENTERTAINING INFORMATION DELIVERY

(71) Applicant: NTECH PROPERTIES, INC., Oxnard, CA (US)

(72) Inventor: Dwight Marcus, Ojai, CA (US)

(73) Assignee: NTECH PROPERTIES, INC., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,873

(22) Filed: Apr. 18, 2016

(65) Prior Publication Data

US 2017/0078768 A1 Mar. 16, 2017

Related U.S. Application Data

(63) Continuation of application No. 14/494,110, filed on Sep. 23, 2014, now Pat. No. 9,317,597, which is a
(Continued)

(51) Int. Cl.
*H04N 21/431* (2011.01)
*H04N 21/8549* (2011.01)
(Continued)

(52) U.S. Cl.
CPC ....... *H04N 21/8549* (2013.01); *G06F 16/738* (2019.01); *G06Q 20/123* (2013.01);
(Continued)

(58) Field of Classification Search
CPC .......... H04N 21/4825; H04N 21/8549; H04N 7/17318; H04N 21/25883;
(Continued)

(56) References Cited

U.S. PATENT DOCUMENTS 6,032,156 A * 2/2000 Marcus ................ G11B 27/031
6,199,076 B1 * 3/2001 Logan .................... G06Q 30/06
715/203

(Continued)

*Primary Examiner* — Junior O Mendoza
(74) *Attorney, Agent, or Firm* — Troutman Pepper Hamilton Sanders LLP

(57) ABSTRACT

Embodiments of the present invention are directed to a method and apparatus for efficient, entertaining information delivery. In one embodiment, information is partitioned into clips. Clips are selected for a user and packaged together for presentation to the user in an entertaining manner. In one embodiment, the clips are selected and packaged together in accordance with a template. In another embodiment, information about a user is used to select clips. In one embodiment, a user is presented with a stream of information comprised of clips of information assembled for the user. The user may select a clip to retrieve additional information related to the clip. In one embodiment, the selected clip is a portion of a program (e.g., a television show, a movie, a song, an advertisement, etc.) and the additional information is a larger clip of the program and/or the entire program.

7 Claims, 3 Drawing Sheets

Related U.S. Application Data continuation of application No. 13/195,709, filed on Aug. 1, 2011, now Pat. No. 8,875,185, which is a continuation of application No. 10/874,819, filed on Jun. 23, 2004, now abandoned.

(60) Provisional application No. 60/482,597, filed on Jun. 24, 2003.

(51) Int. Cl.

| | |
|---|---|
| *G06F 16/738* | (2019.01) |
| *G06Q 30/02* | (2012.01) |
| *H04N 7/173* | (2011.01) |
| *H04N 21/258* | (2011.01) |
| *H04N 21/4722* | (2011.01) |
| *H04N 21/81* | (2011.01) |
| *G06Q 20/12* | (2012.01) |

(52) U.S. Cl.
CPC ......... *G06Q 30/02* (2013.01); *G06Q 30/0273* (2013.01); *H04N 7/17318* (2013.01); *H04N 21/25883* (2013.01); *H04N 21/25891* (2013.01); *H04N 21/4312* (2013.01); *H04N 21/4314* (2013.01); *H04N 21/4722* (2013.01); *H04N 21/812* (2013.01)

(58) Field of Classification Search
CPC ......... H04N 21/25891; H04N 21/4312; H04N 21/4314; H04N 21/4722; H04N 21/812; G06F 16/738; G06Q 30/0273; G06Q 30/02; G06Q 20/123
See application file for complete search history.

(56) References Cited

U.S. PATENT DOCUMENTS

| | | | |
|---|---|---|---|
| 6,317,784 B1* | 11/2001 | Mackintosh | H04H 20/02 348/E7.063 |
| 8,875,185 B2* | 10/2014 | Marcus | G06Q 20/123 725/41 |
| 9,317,597 B2* | 4/2016 | Marcus | G06Q 20/123 |
| 2002/0019858 A1* | 2/2002 | Kaiser | G06Q 30/02 709/219 |
| 2003/0040917 A1* | 2/2003 | Fiedler | G11B 27/031 704/500 |
| 2004/0025180 A1* | 2/2004 | Begeja | G06F 17/30017 725/46 |

* cited by examiner

METHOD AND APPARATUS FOR EFFICIENT, ENTERTAINING INFORMATION DELIVERY

CROSS REFERENCE TO RELATED APPLICATIONS

This application is a continuation application of U.S. patent Ser. No. 14/494,110, filed on Sep. 23, 2014, issued as U.S. Pat. No. 9,317,597 Apr. 19, 2016, which is a continuation application of U.S. patent Ser. No. 13/195,709, filed on Aug. 1, 2011, issued as U.S. Pat. No. 8,875,185 on Oct. 28, 2014, which is a continuation application of U.S. patent application Ser. No. 10/874,819, filed on Jun. 23, 2004, now abondoned, which claims priority to U.S. Provisional Patent Application No. 60/482,597 filed on Jun. 24, 2003. This application hereby also incorporates by reference the disclosures of U.S. patent application Ser. No. 09/896,838 filed Jun. 29, 2001; U.S. patent application Ser. No. 09/953,569 filed Sep. 13, 2001; U.S. patent application Ser. No. 09/953,086 filed on Sep. 10, 2001; and U.S. Pat. No. 6,032,156 filed Apr. 1, 1998. The entire contents of all of the foregoing patents and applications are hereby incorporated by reference herein for all purposes.

FIELD OF THE INVENTION

The present invention relates to the field of information delivery, and in particular to a method and apparatus for efficient, entertaining information delivery.

BACKGROUND OF THE INVENTION

Typical information delivery systems (e.g., the World Wide Web, video on demand, television, etc.) provide information to users inefficiently. Some systems deliver information in a rigid, non-searchable manner that limits the ability of a user to retrieved information of interest to the user. Other systems allow a more flexible search for specific information, but the search is generally performed in a non-entertaining manner and typically requires the user to examine and select from a list of retrieved, potentially relevant items. This problem can be better understood by a review of prior art information delivery systems.

Television Delivery of Information

One of the most commonly used information delivery system is television. A user selects a channel and information is delivered to their speakers and/or screens. Some means of transmitting the information include broadcast, cable and satellite communications. Channel programming is varied. Some channels carry a specific type of programming (e.g., the History Channel or the Movie Channel) and others carry a mix of programming. However, a user has very little control over what information is presented at a specific time. The user's only control is to change channels. If programming content desired by the user is not currently being delivered by one of the available channels, the user is unable to do anything to prompt delivery of the desired content.

Video on Demand

Video on demand (VOD) enhances the user's ability to control the content of the information delivered by the system. In a VOD system, the user is able to select desired content from a list of available content. The selected program is retrieved by the system and sent to the user. However, VOD systems typically do not provide users with an efficient or entertaining interface for requesting information. A user must search through and select from a list of available content.

World Wide Web

The world wide web is another system for delivering a wide variety of information to system users. Typically, a user locates desired information by typing in a web address, performing a search or following links. This method is similar to the VOD method in that the user has more control over what content is delivered. However, in both systems, information retrieval is inefficient and non-entertaining.

SUMMARY OF THE INVENTION

Embodiments of the present invention are directed to a method and apparatus for efficient, entertaining information delivery. In one embodiment, information is partitioned into clips. Clips are selected for a user and packaged together for presentation to the user in an entertaining manner. In one embodiment, the clips are selected and packaged together in accordance with a template. In another embodiment, information about the user is used to select clips. In one embodiment, clips are associated with headers. One type of header is a content header that describes the content of the clip. Other headers describe aesthetic qualities of a clip. In one embodiment, the clip headers contain both content and aesthetic information.

In one embodiment, a user is presented with a stream of information comprised of clips of information assembled for the user. The user may select a clip to retrieve additional information related to the clip. In one embodiment, the selected clip is a portion of a program (e.g., a television show, a movie, a song, an advertisement, etc.) and the additional information is a larger clip of the program and/or the entire program. In one embodiment, selections made by the user are monitored and used in association with templates to determine which clips will be selected and how they will be presented to the user in the stream of information in the future.

In one embodiment, clips are provided to the user at no cost. In another embodiment, the user pays to view certain clips. In one embodiment, the user pays through a debit to an account (similar to ordering a pay-per-view event). In another embodiment, the user pays by viewing other clips and/or information (e.g., an advertisement). In another embodiment, advertisers pay to have information inserted into the information packaged for streaming to a user, thereby subsidizing the user's information retrieval experience.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for efficient, entertaining information delivery. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

In one embodiment, information is partitioned into clips. Clips are selected for a user and packaged together for presentation to the user in an entertaining manner. In one embodiment, the clips are selected and packaged together in accordance with a template. In another embodiment, information about the user is used to select clips. In one embodiment, clips are associated with headers. One type of header is a content header that describes the content of the clip. Other headers describe aesthetic qualities of a clip. In one embodiment, the clip headers contain both content and aesthetic information.

In one embodiment, a user is presented with a stream of information comprised of clips of information assembled for the user. The user may select a clip to retrieve additional information related to the clip. In one embodiment, the selected clip is a portion of a program (e.g., a television show, a movie, a song, an advertisement, etc.) and the additional information is a larger clip of the program and/or the entire program. In one embodiment, selections made by the user are monitored and used in association with templates to determine which clips will be selected and how they will be presented to the user in the stream of information in the future.

Figure 1:
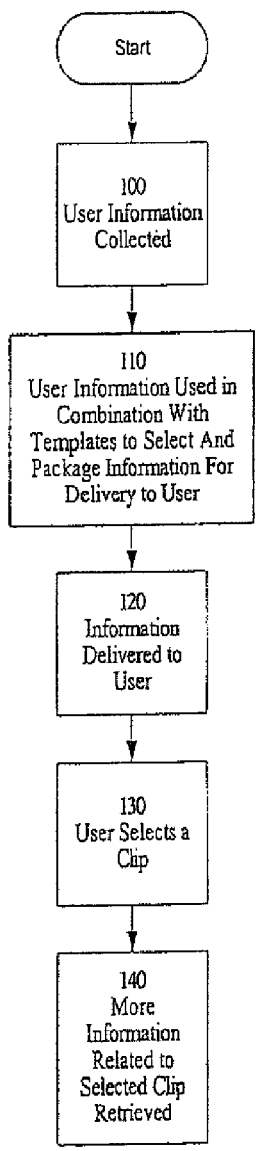
FIG. 1 is a flow diagram of the process of delivering information in accordance with one embodiment of the present invention.

FIG. 1 illustrates the process of delivering information in accordance with one embodiment of the present invention. At block 100, user information is collected. The user information collected varies amongst embodiments. For example, one embodiment collects demographic information (e.g., sex, age, race, geographic location, education level, etc.) about a user as well as information regarding the user's interests and prior history of interaction with the system.

At block 110, the user information is used in combination with templates to select and package the information for delivery to the user. In one embodiment, the templates are used to connect clips in an appealing manner. In another embodiment, the clips also assist in selecting the information (e.g., by placing length and/or style limitations on which clips are eligible to be incorporated at a specific location). In one embodiment, the information is packaged by concatenating clips together to form a stream of data. For example, the clips are media clips and the information is delivered as an observable stream of media (e.g., video and/or audio).

At block 120, the information is delivered to the user. At block 130, the user selects a clip. For example, the user may be interested in learning more about a product displayed in a 6 second clip. At block 140, more information related to the selected clip is retrieved. In the example above, a longer, more detailed ad for the product is retrieved. In another embodiment, the selected clip is a portion of a media program (e.g., a movie or show) and the entire media program is retrieved.

Figure 2:
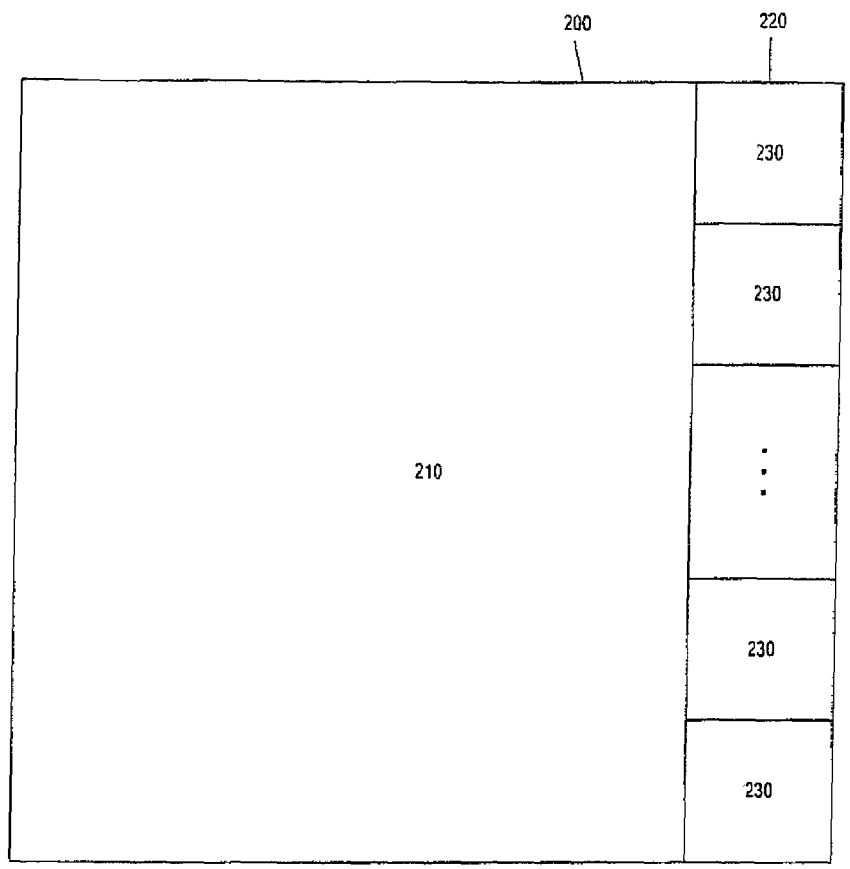
FIG. 2 is a block diagram of an information display in accordance with one embodiment of the present invention.
Figure 3:
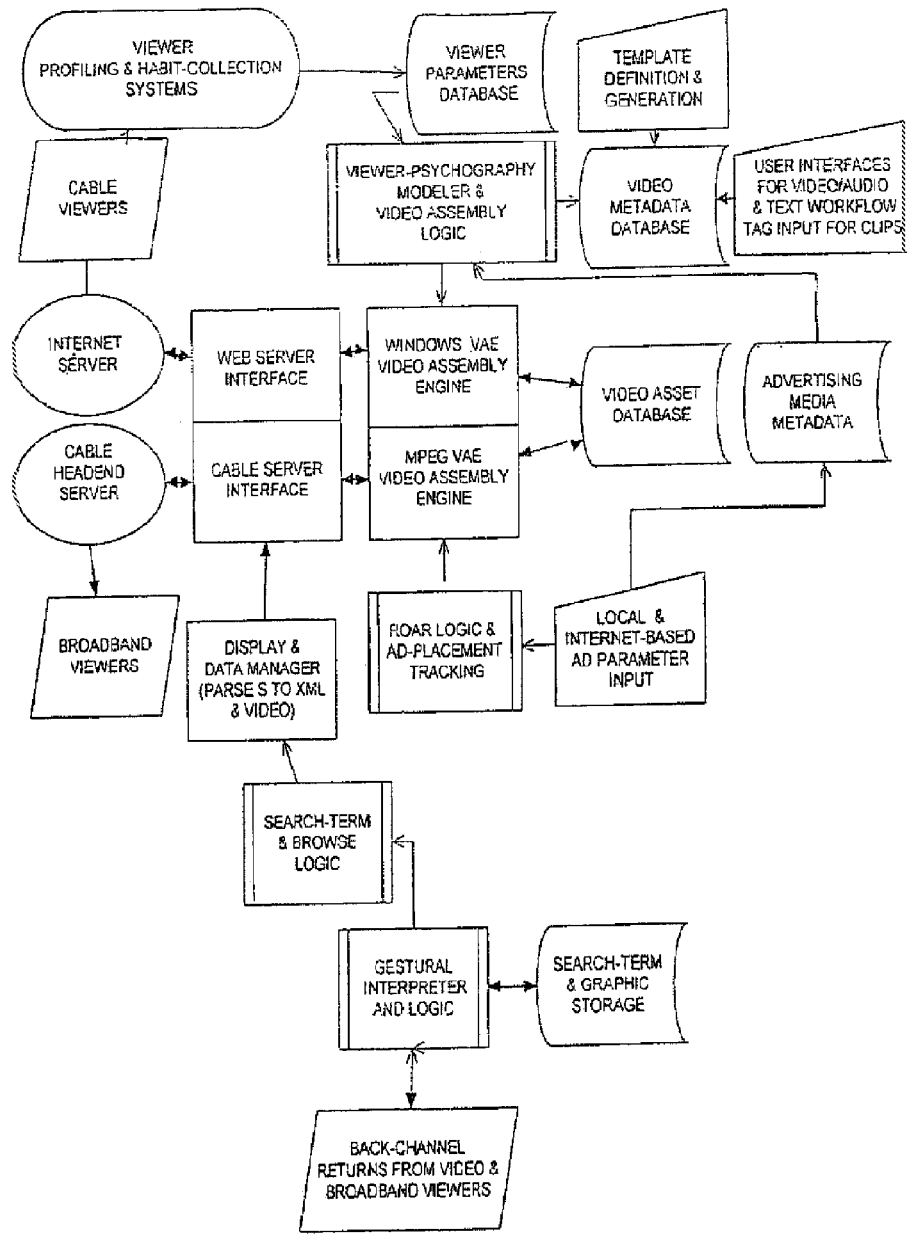
FIG. 3 is a data flow diagram in accordance with one embodiment of the present invention.

FIG. 2 illustrates an information display in accordance with one embodiment of the present invention. The display area 200 is partitioned into a current viewing area 210 and a menu of options area 220. The current viewing area 210 is used to display information the user is currently focusing on. This information may be a continuous program (e.g., a movie or show), or it may be a stream of short previews and/or ads. In one embodiment, the menu of options area 220 may be used as a traditional menu that allows the user to exercise control over what information is delivered.

In another embodiment, the menu of options area 220 is partitioned into a plurality of mini-display regions 230. In one embodiment, once a clip has displayed in the current viewing area 210, the clip continues to display in one of the mini-display regions 230. In one embodiment, the clip replays in a loop in the mini-display region 230 until it is replaced or selected. In another embodiment, a representation of the clip is displayed in the mini-display region 230 until it is replaced.

In one embodiment, clips cycle through the mini-display regions 230 so that the most recently displayed clip is in a first mini-display region and the least recently displayed clip is in a second mini-display region. When a new clip is moved to the menu of options area 220, the least recently displayed clip is replaced by the second least recently displayed clip in the corresponding mini-display region, and other clips are similarly moved to new mini-display regions until the old most recent clip is replaced by the new most recent clip. In another embodiment, the new most recent clip simply replaces the least recently displayed clip in the corresponding mini-display region.

In another embodiment, each mini-display region 230 displays a separate stream of information retrieved for a user. For example, one mini-display region may stream sports-related content while another streams content related to nostalgic ads from the 70's and 80's. In one embodiment, the user controls what content is delivered to each mini-display region by selecting from a list of general categories or channels. In another embodiment, the content delivered to each mini-display region is altered by the user's selections from that and/or other mini-display regions.

In one embodiment, the user selects information for display in the current viewing area 210 by selecting a clip either from a stream of clips delivered to the current viewing area 210 or to one of the mini-display regions 230. In one embodiment, the user has the ability to hide or display the menu of options area 220. Thus, a user can select a movie for viewing by selecting a clip of the movie from a stream of clips and then view the movie using the entire display area 200.

In one embodiment, clips are provided to the user at no cost. In another embodiment, the user pays to view certain clips. In one embodiment, the user pays through a debit to an account (similar to ordering a pay-per-view event). In another embodiment, the user pays by viewing other clips and/or information (e.g., an advertisement). In another embodiment, advertisers pay to have information inserted into the information packaged for streaming to a user, thereby subsidizing the user's information retrieval experience.

One example of methods, apparatus and systems, suitable for implementing the invention, is set forth in the Appendix attached hereto and which is specifically incorporated by reference herein.

Thus, a method and apparatus for efficient, entertaining information deliver is described in conjunction with one or more specific embodiments. It will be apparent from the foregoing that, while particular forms of the invention have been illustrated and described, various alternatives, modifications and variations can be made without departing from the spirit and scope of the invention. Accordingly, the invention is intended to embrace all such alternatives, modifications and variations and it is not intended that the invention be limited, except as by the appended claims.

What is claimed is:

1. A method of providing video programming, comprising:

receiving, by a processor of a media delivery server, a user's request for a stream of media from the user's device;

storing, by a non-transitory storage medium of the media delivery server, a first class of non-monetizing media clips and a second class of monetizing media clips, wherein the non-monetizing media clips including royalty-free media clips and media clips for which royalty payments are due if delivered to a user, and the monetizing media clips including any media clip which generates revenue for an operator of the media delivery server;

searching, by the processor of the media delivery server a viewing history database for the user's profile, the user's profile including the user's prior viewing and listening sessions, demographic and geographic data;

automatically retrieving, by the processor, without human interaction, a list of appropriate potential media clips from the second class of monetizing media clips of the non-transitory storage medium, based on the user's profile;

generating, by the processor, a unique concatenated stream of media clips from the retrieved list of appropriate potential media clips, the generated unique concatenated stream of media clips including one or more short-form monetizing media;

streaming to the user the generated unique concatenated stream of media clips;

providing, by the processor, an information display displayed on the user's device and partitioning the information display to comprise:
  a first viewing area;
  a second display area; and playing, in the first viewing area, the generated unique concatenated stream of media clips;

receiving the user's selection of at least one short-form teaser when the generated unique concatenated stream of media clips is played;

playing, in the first viewing area, a long-form advertisement associated with the user's selection after receiving the user's selection;

when each concatenated media clip completes playing, entering a visual exemplary representation of the concatenated media clip into the second display area, wherein the second display area includes a plurality of viewing areas, each viewing area is configured to display a visual exemplary representation of one of the played media clips;

receiving the user's selection on one of the visual exemplary representations in the second display area;

interrupting, by the processor, a queued list of media clips prepared for the user;

generating a new clip associated with the selected visual exemplary representation based on a predefined rule, wherein the new clip is not previously played; and sending the new clip to the first viewing area.

2. The method of claim 1, wherein the second display area includes a second viewing area and a third viewing area, and wherein the method further comprises the steps of:

playing a primary video clip in the second viewing area;

playing the primary video clip in the third viewing area when a secondary video clip completes displaying in the first viewing area; and playing the secondary video clip in the second viewing area when the primary video clip is displayed in the third viewing area.

3. The method of claim 1, wherein the second display area includes at least one viewing area displaying the video clips in a first-in, first-out order.

4. The method of claim 1, wherein the predefined rule is based on at least one of the following: the user's demographic data and geographic data.

5. The method of claim 1, wherein at least one of the media clips is tagged or labelled with aesthetic values of any useful type.

6. The method of claim 1, wherein at least one of the media clips is tagged or labelled with content values of any useful kind.

7. A method of providing media programming, comprising:

providing, by a computer, an information display displayed on a user's computer and partitioning the information display to comprise:
  a first viewing area;
  a second display area; and streaming to the user a unique concatenated stream of media clips, the unique concatenated stream of media clips including one or more short-form teasers of advertisements;

playing, in the first viewing area, the unique concatenated stream of media clips;

receiving the user's selection of at least one short-form teaser when the generated unique concatenated stream of media clips is played;

playing, in the first viewing area, a long-form advertisement associated with the user's selection after receiving the user's selection;

when each concatenated media clip completes playing, displaying an exemplary visual element representative of a last-played clip in the second display area, wherein the second display area includes a plurality of viewing areas, each viewing area is configured to display a visual exemplary representation of one of the played media clips, wherein each user can select one of the played media clips, wherein each user's selection interacts with the user's unique viewing history, the user's personal profile and an assembly logic or template branching functionality, to create a stream of media programming that dynamically optimizes the selected media clip and dynamically reshuffles or automatically generates new concatenations of media clips which become progressively more targeted to the user;

receiving the user's selection on one of the images in the second display area;

interrupting, by the processor, a queued list of media clips prepared for the user;

generating a new clip associated with the selected visual exemplary representation based on a predefined rule, wherein the new clip is not previously played; and sending the new clip to the first viewing area, wherein each media clip includes at least one of the following: video, audio, and other time-based content, wherein each media clip is presented in a time-based or sequential form, and wherein the second display area includes at least one viewing area displaying, in a first-in, first-out order, the one or more visual elements signifying media programs historically played in the main viewing area.

* * * * *